United States Patent
Dijkman et al.

(10) Patent No.: US 10,318,848 B2
(45) Date of Patent: Jun. 11, 2019

(54) METHODS FOR OBJECT LOCALIZATION AND IMAGE CLASSIFICATION

(71) Applicant: QUALCOMM Incorporated, San Diego, CA (US)

(72) Inventors: Daniel Hendricus Franciscus Dijkman, Haarlem (NL); David Jonathan Julian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 231 days.

(21) Appl. No.: 15/247,805

(22) Filed: Aug. 25, 2016

(65) Prior Publication Data

US 2017/0169314 A1    Jun. 15, 2017

Related U.S. Application Data

(60) Provisional application No. 62/267,823, filed on Dec. 15, 2015.

(51) Int. Cl.
| | |
|---|---|
| *G06K 9/32* | (2006.01) |
| *G06K 9/46* | (2006.01) |
| *G06K 9/62* | (2006.01) |
| *G06K 9/66* | (2006.01) |

(52) U.S. Cl.
CPC ............ *G06K 9/66* (2013.01); *G06K 9/3233* (2013.01); *G06K 9/4628* (2013.01); *G06K 9/623* (2013.01); *G06K 9/627* (2013.01); *G06K 9/628* (2013.01); *G06K 9/6257* (2013.01); *G06K 9/6261* (2013.01)

(58) Field of Classification Search
CPC ........ G06K 9/66; G06K 9/3233; G06K 9/628; G06K 9/4628; G06K 9/6261; G06K 9/6257; G06K 9/623; G06K 9/627
See application file for complete search history.

(56) References Cited

U.S. PATENT DOCUMENTS

| | | |
|---|---|---|
| 8,503,767 B2 | 8/2013 | Sun et al. |
| 8,509,526 B2 | 8/2013 | Haas et al. |
| 9,152,860 B2 | 10/2015 | Cervin et al. |

(Continued)

FOREIGN PATENT DOCUMENTS

JP          2006252559 A        9/2006

OTHER PUBLICATIONS

C. Szegedy, A. Toshev, and D. Erhan. Deep Neural Networks for Object Detection. "In Advances in Neural Information Processing Systems (NIPS)", 2013.*

(Continued)

*Primary Examiner* — Chan S Park
*Assistant Examiner* — Elisa M Rice
(74) *Attorney, Agent, or Firm* — Seyfarth Shaw LLP

(57) ABSTRACT

A method of training for image classification includes labelling a crop from an image including an object of interest. The crop may be labelled with an indication of whether the object of interest is framed, partially framed or not present in the crop. The method may also include assigning a fully framed class to the labelled crop, including the object of interest, if the object of interest is framed. A labelled crop may be assigned a partially framed class if the object of interest is partially framed. A background class may be assigned to a labelled crop if the object of interest is not present in the crop.

16 Claims, 10 Drawing Sheets

(56) References Cited

U.S. PATENT DOCUMENTS

| | | | |
|---|---|---|---|
| 9,275,308 B2 | 3/2016 | Szegedy et al. | |
| 2008/0063264 A1* | 3/2008 | Porikli | G06K 9/00369 382/159 |
| 2012/0294514 A1 | 11/2012 | Saunders et al. | |
| 2016/0063357 A1* | 3/2016 | Gao | G06K 9/4604 382/159 |

OTHER PUBLICATIONS

Erhan D., et al., "Scalable Object Detection Using Deep Neural Networks", 2014 IEEE Conference on Computer Vision and Pattern Recognition, IEEE, Jun. 23, 2014 (Jun. 23, 2014), pp. 2155-2162, XP032649294, DOI: 10.1109/CVPR.2014.276.
International Search Report and Written Opinion—PCT/US2016/059956—ISA/EPO—Jan. 5, 2017.
Krizhevsky A., et al., "ImageNet Classification with Deep Convolutional Neural Networks" Advances in Neural Information Processing Systems 25, 2012, pp. 1106-1114.
Simonyan K., et al., "Very Deep Convolutional Networks for Large-Scale Image Recognition", International Conference on Learning Representation, Apr. 10, 2015, XP055270857, 14 pages.
Szegedy C., et al., "Scalable Object Detection Using Deep Neural Networks", Advances in Neural Information Processing Systems, Dec. 5, 2013, XP055329984, pp. 1-9.
Ioffe S., et al., "Batch Normalization: Accelerating Deep Network Training by Reducing Internal Covariate Shift", International Conference on Machine Learning, arXiv:1502.03167v3, Mar. 2, 2015, pp. 1-11.
Girshick R., et al., "Rich Feature Hierarchies for Accurate Object Detection and Semantic Segmentation Tech Report (v5)",Proceedings of the IEEE conference on computer vision and pattern recognition, Oct. 22, 2014 (Oct. 22, 2014), pp. 1-21, XP055295233, Retrieved from the Internet: URL: https://arxiv.org/pdf/1311.2524v5.pdf.
Ouyang W., et al., "DeepID-Net: Multi-Stage and Deformable Deep Convolutional Neural Networks for Object Detection", Computer Vision and Pattern Recognition,arXiv:1409.3505v1, Sep. 11, 2014, 13 pages.
Redmon J., et al., "You Only Look Once: Unified, Real-Time Object Detection", Proceedings of the IEEE Conference on Computer Vision and Pattern Recognition, arXiv preprint arXiv:1506.02640v5, May 9, 2016, 10 pages.
Russakovsky O., et al., "ImageNet Large Scale Visual Recognition Challenge", International Journal of Computer Vision, arXiv:1409.0575v3, Jan. 30, 2015, pp. 1-43.
Szegedy C., et al., "Going Deeper with Convolutions",Computer Vision and Pattern Recognition, Sep. 17, 2014 (Sep. 17, 2014), pp. 1-12, XP055230968, Retrieved from the Internet: URL: http://arxiv.org/pdf/1409.4842v1.pdf [retrieved on Nov 24, 2015].
Van De Sande K.E.A., et al., "Segmentation as Selective Search for Object Recognition", IEEE International Conference on Computer Vision (ICCV), 2011, 8 pages.
Wu R., et al., "Deep Image: Scaling Up Image Recognition", Computer Vision and Pattern Recognition, arXiv:1501.02876, 2015, 12 pages.

* cited by examiner

METHODS FOR OBJECT LOCALIZATION AND IMAGE CLASSIFICATION

CROSS-REFERENCE TO RELATED APPLICATION

The present application claims the benefit of U.S. Provisional Patent Application No. 62/267,823, filed on Dec. 15, 2015, and titled "METHODS FOR OBJECT LOCALIZATION AND CLASSIFICATION," the disclosure of which is expressly incorporated by reference herein in its entirety.

BACKGROUND

Field

Certain aspects of the present disclosure generally relate to machine learning and, more particularly, to improving systems and methods of object localization and classification.

Background

An artificial neural network, which may comprise an interconnected group of artificial neurons (e.g., neuron models), is a computational device or represents a method to be performed by a computational device.

Convolutional neural networks are a type of feed-forward artificial neural network. Convolutional neural networks may include collections of neurons that each has a receptive field and that collectively tile an input space. Convolutional neural networks (CNNs) have numerous applications. In particular, CNNs have broadly been used in the area of pattern recognition and classification.

Deep learning architectures, such as deep belief networks and deep convolutional networks, are layered neural networks architectures in which the output of a first layer of neurons becomes an input to a second layer of neurons, the output of a second layer of neurons becomes and input to a third layer of neurons, and so on. Deep neural networks may be trained to recognize a hierarchy of features and so they have increasingly been used in object recognition applications. Like convolutional neural networks, computation in these deep learning architectures may be distributed over a population of processing nodes, which may be configured in one or more computational chains. These multi-layered architectures may be trained one layer at a time and may be fine-tuned using back propagation.

Other models are also available for object recognition. For example, support vector machines (SVMs) are learning tools that can be applied for classification. Support vector machines include a separating hyperplane (e.g., decision boundary) that categorizes data. The hyperplane is defined by supervised learning. A desired hyperplane increases the margin of the training data. In other words, the hyperplane should have the greatest minimum distance to the training examples.

Although these solutions achieve excellent results on a number of classification benchmarks, their computational complexity can be prohibitively high. Additionally, training of the models may be challenging.

SUMMARY

In an aspect of the present disclosure, a method of training for image classification is presented. The method includes labelling a crop from an image including an object of interest with an indication of whether the object of interest is framed, partially framed or not present in the crop. The method also includes assigning a fully framed class to the labelled crop, including the object of interest, if the object of interest is framed. The method additionally includes assigning a partially framed class to the labelled crop, including the object of interest, if the object of interest is partially framed. The method further includes assigning a background class to the labelled crop if the object of interest is not present in the crop.

In another aspect of the present disclosure, an apparatus for training for image classification is presented. The apparatus includes a memory and at least one processor coupled to the memory. The one or more processors are configured to label a crop from an image including an object of interest with an indication of whether the object of interest is framed, partially framed or not present in the crop. The processor(s) is(are) also configured to assign a fully framed class to the labelled crop, including the object of interest, if the object of interest is framed. The processor(s) is(are) additionally configured to assign a partially framed class to the labelled crop, including the object of interest, if the object of interest is partially framed. The processor(s) is(are) further configured to assign a background class to the labelled crop if the object of interest is not present in the crop.

In yet another aspect of the present disclosure, an apparatus for training for image classification is presented. The apparatus includes means for labelling a crop from an image including an object of interest with an indication of whether the object of interest is framed, partially framed or not present in the crop. The apparatus also includes means for assigning a fully framed class to the labelled crop, including the object of interest, if the object of interest is framed. The apparatus additionally includes means for assigning a partially framed class to the labelled crop, including the object of interest, if the object of interest is partially framed. The apparatus further includes means for assigning a background class to the labelled crop if the object of interest is not present in the crop.

In still another aspect of the present disclosure, a non-transitory computer readable medium is presented. The non-transitory computer readable medium has encoded thereon program code for training for image classification. The program code is executed by a processor and includes program code to label a crop from an image including an object of interest with an indication of whether the object of interest is framed, partially framed or not present in the crop. The program code also includes program code to assign a fully framed class to the labelled crop, including the object of interest, if the object of interest is framed. The program code additionally includes program code to assign a partially framed class to the labelled crop, including the object of interest, if the object of interest is partially framed. The program code further includes program code to assign a background class to the labelled crop if the object of interest is not present in the crop.

In an aspect of the present disclosure, a method of training for image classification is presented. The method includes selecting a crop from an image. The method also includes determining whether the crop of the image includes an area surrounded by a predetermined bounding box. The method further includes discarding the crop if the crop of the image does not include a portion of the area surrounded by the predetermined bounding box.

In another aspect of the present disclosure, an apparatus for training for image classification is presented. The apparatus includes a memory and at least one processor coupled to the memory. The one or more processors are configured to select a crop from an image. The processor(s) is(are) also configured to determine whether the crop of the image includes an area surrounded by a predetermined bounding box. The processor(s) is(are) further configured to discard the crop if the crop of the image does not include a portion of the area surrounded by the predetermined bounding box.

In yet another aspect of the present disclosure, an apparatus for training for image classification is presented. The apparatus includes means for selecting a crop from an image. The apparatus also includes means for determining whether the crop of the image includes an area surrounded by a predetermined bounding box. The apparatus further includes means for discarding the crop if the crop of the image does not include a portion of the area surrounded by the predetermined bounding box.

In still another aspect of the present disclosure, a non-transitory computer readable medium is presented. The non-transitory computer readable medium has encoded thereon program code for training for image classification. The program code is executed by a processor and includes program code to select a crop from an image. The program code also includes program code to determine whether the crop of the image includes an area surrounded by a predetermined bounding box. The program code further includes program code to discard the crop if the crop of the image does not include a portion of the area surrounded by the predetermined bounding box.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
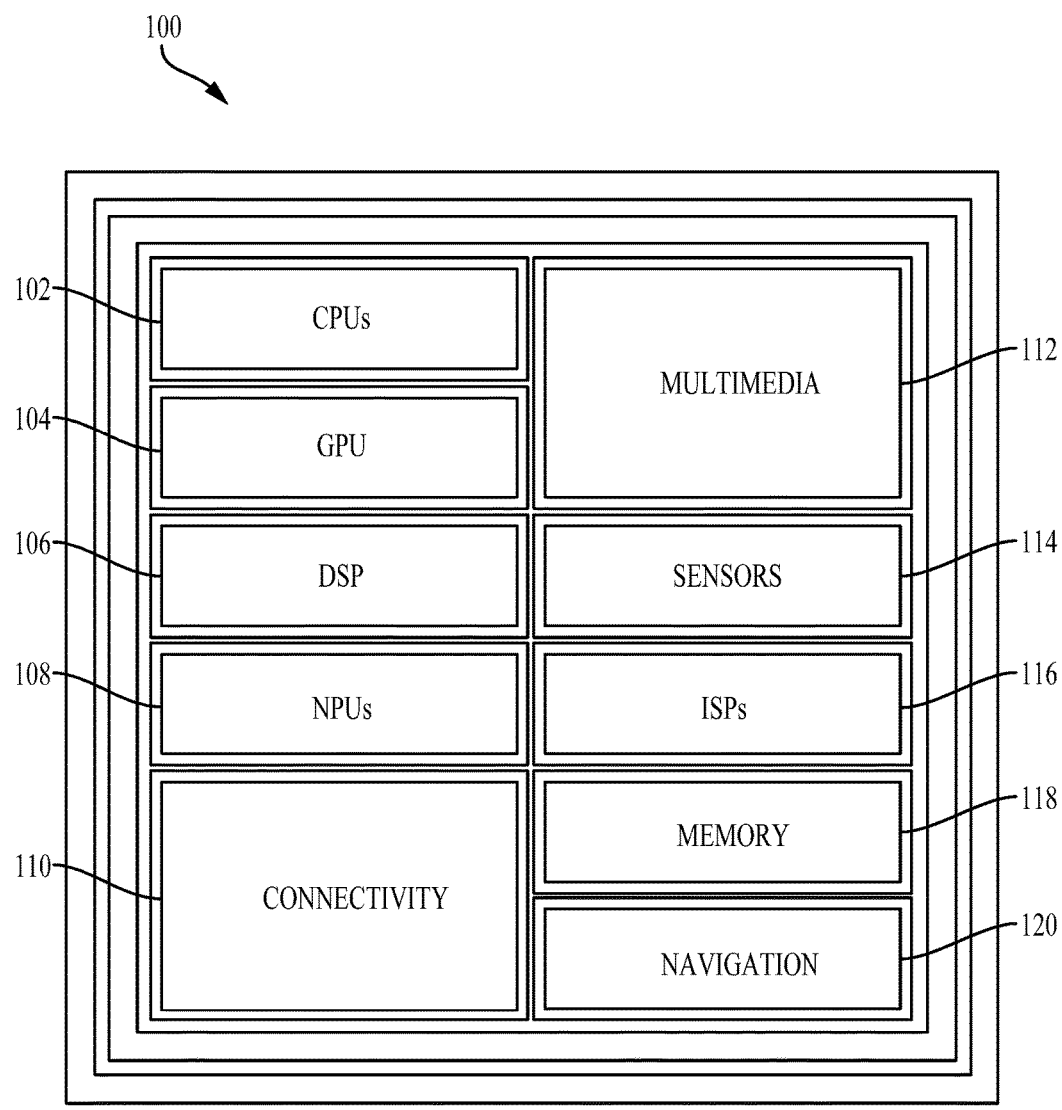
FIG. 1 illustrates an example implementation of designing a neural network using a system-on-a-chip (SOC), including a general-purpose processor in accordance with certain aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Object Localization and Image Classification

Aspects of the present disclosure are directed to improved methods for object localization and image classification.

In some aspects of the present disclosure, classification may comprise full-image classification. That is, classification may comprise assigning a single label to an entire image. However, in other aspects, classification may comprise assigning labels to multiple portions of an image.

For classification, large and deep convolutional neural networks are trained on large labeled datasets. These datasets may contain millions of images. The labels for the images may come from thousands of categories. Examples of such datasets include the ImageNet dataset and the dataset used for the ImageNet Large Scale Visual Recognition Challenge (ILSVRC). The dataset used for the ILSVRC contains about 1.5 million images and 1000 categories. The labels are obtained through human annotation, which is a very laborious process.

A standard neural network, as used for image recognition, has a fixed-size input for the image and a fixed-size output for the classification result (e.g., one output for each category). Between the input and the output, the network may comprise multiple layers. The layers perform a sequence of linear transformations (e.g., convolution or matrix multiplication). The weights for these transformations are learned. The linear transformations are interleaved with non-linear transformations such as a sigmoid or a rectifier linear unit (RELU) function. For example, the RELU may be configured to set all negative activation values to 0. One goal is for each layer to compute a higher-level representation of the image. For example, the first layer may recognize only edges, while the second layer may recognize corners, and in the third to fourth layers, parts of real-world objects may be recognized.

Another layer frequently used in convolutional neural networks (convnets or CNNs) is a so-called pooling layer. Pooling layers may be used to reduce the resolution of an image. For example, an input image having a resolution of 224×224, may be reduced to 112×112, 56×56, 28×28, 14×14 and ultimately to 7×7 though the use of multiple pooling layers.

Standard neural networks for image recognition may be trained by presenting them with training images with known labels. A classification error may be determined and reduced using error gradient back propagation. The error gradient may be used to update the weights of the transformations such that the error goes down, which is referred to as 'learning'.

However, training data may be insufficient. That is, there may be an insufficient number of labeled examples to adequately train the neural network. As such, data augmentation techniques may be used to artificially increase the number of training examples. Examples of data augmentation techniques include but are not limited to horizontally mirroring images, translating the image, scaling the image, vignetting, color casting, and lens distortion.

Data augmentation may be used during training and at test time. By testing multiple variants of each image and averaging the results, accuracy can be improved significantly. In one example, about 150 different crops of each image are tested (15 scales, 5 positions in the image, mirror or not mirrored).

For high-quality classification, multiple networks may be used. Each of the networks may test the same variants (crops) of the image and their results may be averaged. This is called an ensemble of networks, and may reduce the error rate significantly.

Object Localization

Object localization is the process of determining a location of an object in an image. For instance, localization may comprise placing a bounding box (e.g., a tight bounding box) around an object. In some aspects, an object may be localized by the proposed bounding box if a portion of the object is included in the bounding box. For example, the determined location may be compared with a bounding box created using human annotation, which may be referred to as a ground truth bounding box. In this case, the object may be considered localized based on a degree of overlap between the generated bounding box and the ground truth bounding box (e.g., more than 50% according to the intersection over union (IOU) measure). Having located the object, a classification process may be performed to identify any objects included in the bounding box.

A high-quality object localization process may include a bounding box proposal, a bounding box classification and bounding box regression.

Bounding Box Proposal

Conventional box proposal processes propose several plausible bounding boxes using specialized algorithms, such as selective search or edge boxes. These boxes are determined using local properties of the images, such as texture, color or edges. Depending on the settings, a conventional box proposal process proposes between 500 and 5000 bounding box candidates.

Convolutional neural networks may also be used for box proposal. While these methods are very efficient, they may not be competitive for high-quality results. Other methods such as spectral saliency are very fast but may not offer the desired quality for box proposals.

Bounding Box Classification

Many of the proposed bounding boxes may not correspond to actual (full) objects. Accordingly, it may be desirable to separate the bounding box proposals that include the full object from those that do not. Conventional localization techniques attempt to do this using a convolutional neural network that is trained to classify the content of the proposed boxes. The areas corresponding to each of the boxes may be cropped from the images and scaled to match the convolutional neural network input size, and the convolutional neural network is trained to classify whether the crop contains an entire object (and if so, of what type), or 'background.' The networks may be pre-trained on the full images, and later fine-tuned for bounding box classification.

At test-time, the boxes that are assigned very high scores may be marked as containing the corresponding objects. Often, there will be multiple high-scoring overlapping proposals, so local non-maximum suppression is used to pick the locally highest-scoring box proposal. In local non-maximum suppression (or non-maximum suppression), if a group of bounding box proposals with high scores have some overlap with each other, the one box with the maximum score may be selected as the 'winner'. All other boxes that overlap the winning box by more than a threshold value (e.g., 0.5 intersection over union (IOU)) may be discarded. This process may be repeated until there are no more overlapping boxes.

As with classification, an ensemble of networks can be trained and used to perform bounding box classification.

Bounding Box Regression

The common final step is called bounding box regression. Here, yet another convolutional neural network is trained to improve upon the 'winning' box proposals. This convolutional neural network is tasked with adjusting the corner coordinates of the winning proposal such that it better matches the object. For example, given a bounding box proposal around an object in an image, the corresponding area from the image may be cropped and scaled to match an input size of a bounding box regression network. In some aspects, the crop may include a border around the proposed bounding box so the network can 'see' or observe the context. The network may, for instance, have four outputs corresponding to the four coordinates of the upper left and lower right corner of the bounding box. Each of these outputs may be trained to output an offset that may be added to the corresponding coordinate for improved matching of the proposed bounding box to the object of interest.

In accordance with aspects of the present disclosure, convolutional neural networks may initially be pre-trained for bounding box classification by learning to be location-sensitive. In some aspects, the convolutional neural networks (e.g., a convnet pre-trained for bounding box classification) may also be used during testing to estimate for each crop whether it is a 'background' patch.

Additionally, in some aspects, bounding boxes (e.g., ground truth bounding boxes) may be used to ensure that the selected crops include the labeled object (e.g., the object of interest) or a portion thereof. Furthermore, in some aspects, a bounding box may be generated when a bounding box is not provided for an image using the localization techniques of the present disclosure.

FIG. 1 illustrates an example implementation of the aforementioned localization and image classification using a system-on-a-chip (SOC) 100, which may include a general-purpose processor (CPU) or multi-core general-purpose processors (CPUs) 102 in accordance with certain aspects of the present disclosure. Variables (e.g., neural signals and synaptic weights), system parameters associated with a computational device (e.g., neural network with weights), delays, frequency bin information, and task information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a dedicated memory block 118, or may be distributed across multiple blocks. Instructions executed at the general-purpose processor 102 may be loaded from a program memory associated with the CPU 102 or may be loaded from a dedicated memory block 118.

The SOC 100 may also include additional processing blocks tailored to specific functions, such as a GPU 104, a DSP 106, a connectivity block 110, which may include fourth generation long term evolution (4G LTE) connectivity, unlicensed Wi-Fi connectivity, USB connectivity, Bluetooth connectivity, and the like, and a multimedia processor 112 that may, for example, detect and recognize gestures. In one implementation, the NPU is implemented in the CPU, DSP, and/or GPU. The SOC 100 may also include a sensor processor 114, image signal processors (ISPs), and/or navigation 120, which may include a global positioning system.

The SOC 100 may be based on an ARM instruction set. In an aspect of the present disclosure, the instructions loaded into the general-purpose processor 102 may comprise code for labelling a crop from an image including an object of interest with an indication of whether the object of interest is framed, partially framed or not present in the crop. The instructions loaded into the general-purpose processor 102 may also comprise code for assigning a fully framed class to the labelled crop, including the object of interest, if the object of interest is framed. Additionally, the instructions loaded into the general-purpose processor 102 may comprise code for assigning a partially framed class to the labelled crop, including the object of interest, if the object of interest is partially framed. The instructions loaded into the general-purpose processor 102 may further comprise code assigning a background class to the labelled crop if the object of interest is not present in the crop In another aspect of the present disclosure, the instructions loaded into the general-purpose processor 102 may comprise code for selecting a crop from an image. The instructions loaded into the general-purpose processor 102 may also comprise code for determining whether the crop of the image includes an area surrounded by a predetermined bounding box. The instructions loaded into the general-purpose processor 102 may further comprise code for discarding the crop if the image does not include a portion of the area surrounded by the predetermined bounding box.

Figure 2:
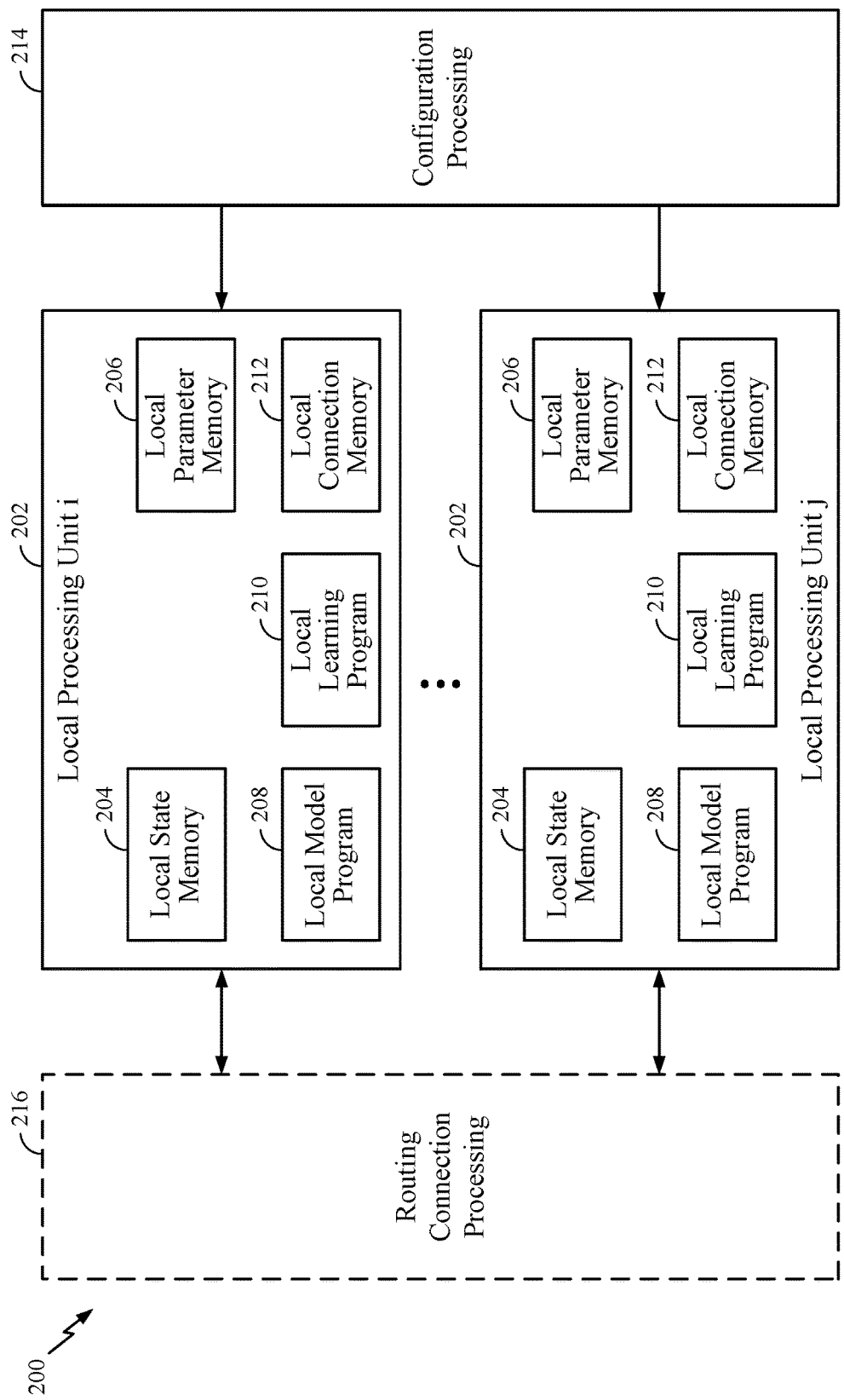
FIG. 2 illustrates an example implementation of a system in accordance with aspects of the present disclosure.

FIG. 2 illustrates an example implementation of a system 200 in accordance with certain aspects of the present disclosure. As illustrated in FIG. 2, the system 200 may have multiple local processing units 202 that may perform various operations of methods described herein. Each local processing unit 202 may comprise a local state memory 204 and a local parameter memory 206 that may store parameters of a neural network. In addition, the local processing unit 202 may have a local (neuron) model program (LMP) memory 208 for storing a local model program, a local learning program (LLP) memory 210 for storing a local learning program, and a local connection memory 212. Furthermore, as illustrated in FIG. 2, each local processing unit 202 may interface with a configuration processor unit 214 for providing configurations for local memories of the local processing unit, and with a routing connection processing unit 216 that provides routing between the local processing units 202.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 3A:
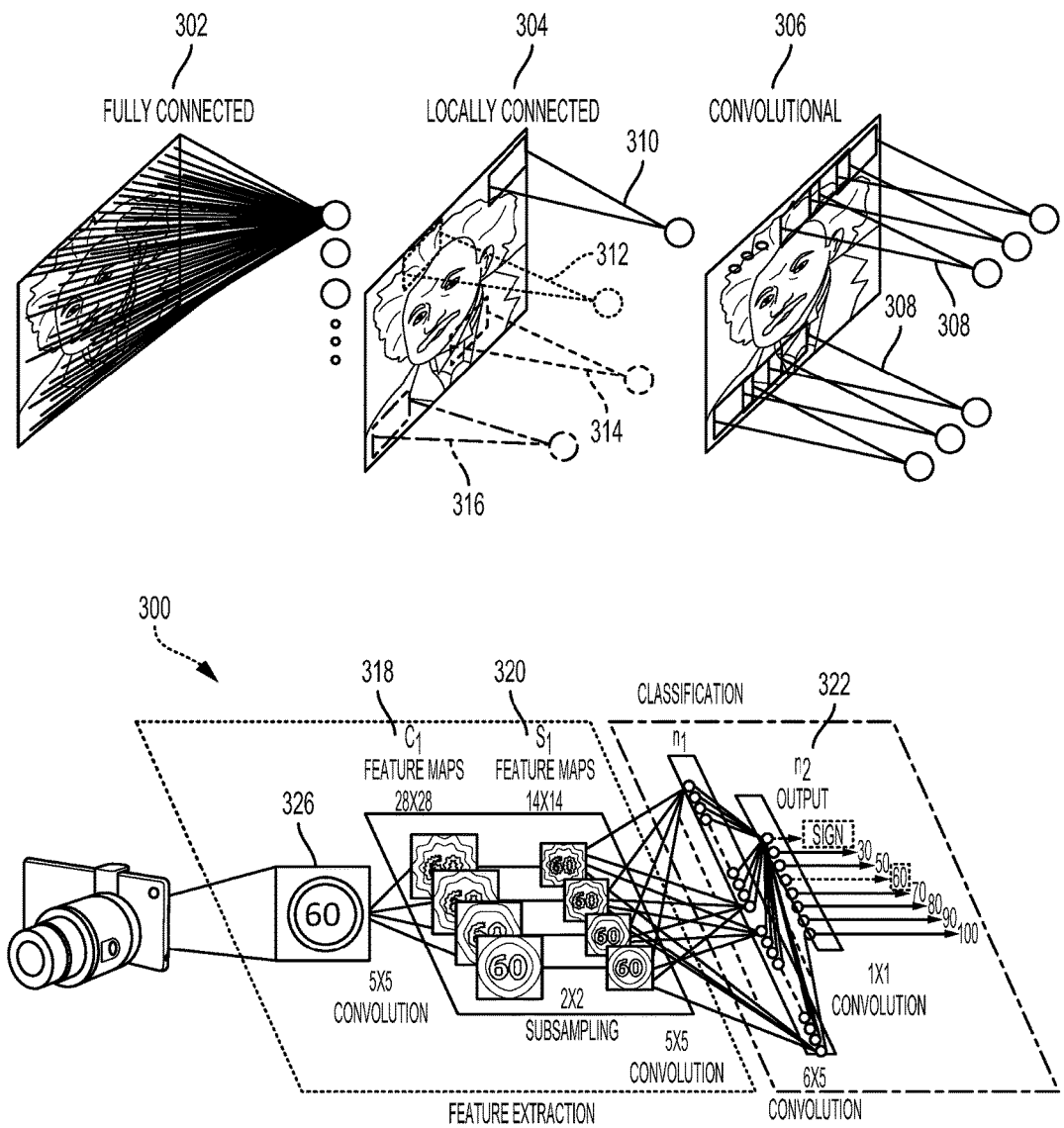
FIG. 3A is a diagram illustrating a neural network in accordance with aspects of the present disclosure.

Referring to FIG. 3A, the connections between layers of a neural network may be fully connected 302 or locally connected 304. In a fully connected network 302, a neuron in a first layer may communicate its output to every neuron in a second layer, so that each neuron in the second layer will receive input from every neuron in the first layer. Alternatively, in a locally connected network 304, a neuron in a first layer may be connected to a limited number of neurons in the second layer. A convolutional network 306 may be locally connected, and is further configured such that the connection strengths associated with the inputs for each neuron in the second layer are shared (e.g., 308). More generally, a locally connected layer of a network may be configured so that each neuron in a layer will have the same or a similar connectivity pattern, but with connections strengths that may have different values (e.g., 310, 312, 314, and 316). The locally connected connectivity pattern may give rise to spatially distinct receptive fields in a higher layer, because the higher layer neurons in a given region may receive inputs that are tuned through training to the properties of a restricted portion of the total input to the network.

Locally connected neural networks may be well suited to problems in which the spatial location of inputs is meaningful. For instance, a network 300 designed to recognize visual features from a car-mounted camera may develop high layer neurons with different properties depending on their association with the lower versus the upper portion of the image. Neurons associated with the lower portion of the image may learn to recognize lane markings, for example, while neurons associated with the upper portion of the image may learn to recognize traffic lights, traffic signs, and the like.

A deep convolutional network (DCN) may be trained with supervised learning. During training, a DCN may be presented with an image, such as a cropped image of a speed limit sign 326, and a "forward pass" may then be computed to produce an output 322. The output 322 may be a vector of values corresponding to features such as "sign," "60," and "100." The network designer may want the DCN to output a high score for some of the neurons in the output feature vector, for example the ones corresponding to "sign" and "60" as shown in the output 322 for a network 300 that has been trained. Before training, the output produced by the DCN is likely to be incorrect, and so an error may be calculated between the actual output and the target output. The weights of the DCN may then be adjusted so that the output scores of the DCN are more closely aligned with the target.

To adjust the weights, a learning algorithm may compute a gradient vector for the weights. The gradient may indicate an amount that an error would increase or decrease if the weight were adjusted slightly. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted so as to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level.

After learning, the DCN may be presented with new images 326 and a forward pass through the network may yield an output 322 that may be considered an inference or a prediction of the DCN.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer 318 and 320, with each element of the feature map (e.g., 320) receiving input from a range of neurons in the previous layer (e.g., 318) and from each of the multiple channels. The values in the feature map may be further processed with a non-linearity, such as a rectification, max(0,x). Values from adjacent neurons may be further pooled, which corresponds to down sampling, and may provide additional local invariance and dimensionality reduction. Normalization, which corresponds to whitening, may also be applied through lateral inhibition between neurons in the feature map.

The performance of deep learning architectures may increase as more labeled data points become available or as computational power increases. Modern deep neural networks are routinely trained with computing resources that are thousands of times greater than what was available to a typical researcher just fifteen years ago. New architectures and training paradigms may further boost the performance of deep learning. Rectified linear units may reduce a training issue known as vanishing gradients. New training techniques may reduce over-fitting and thus enable larger models to achieve better generalization. Encapsulation techniques may abstract data in a given receptive field and further boost overall performance.

Figure 3B:
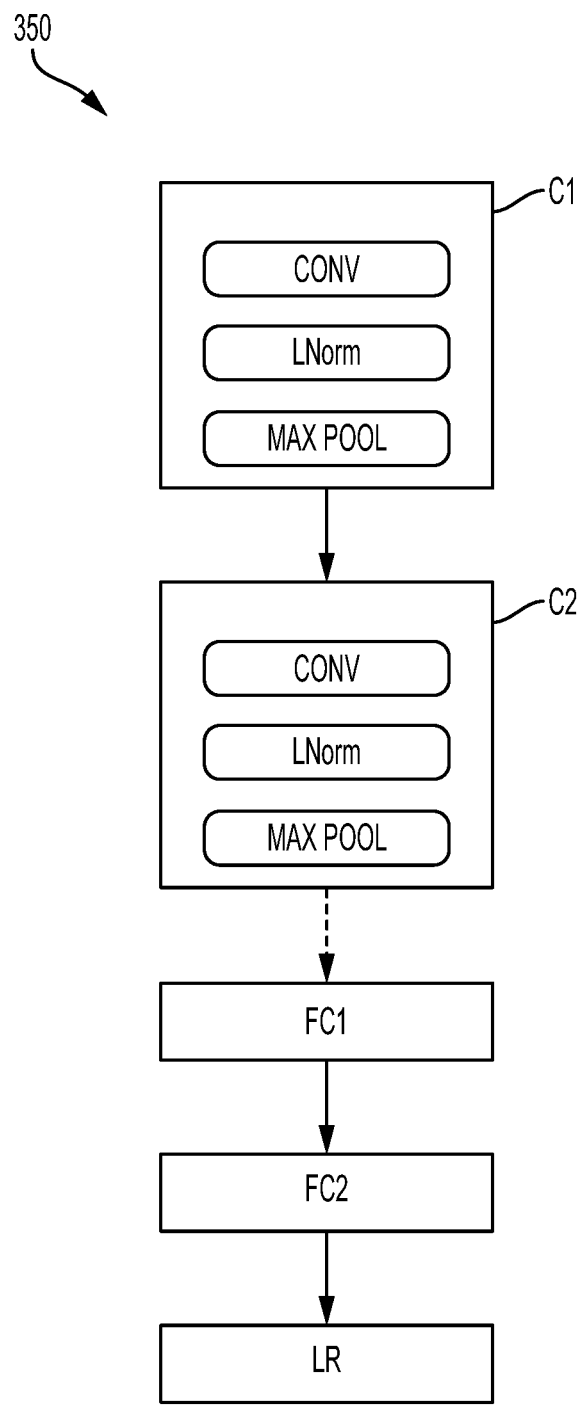
FIG. 3B is a block diagram illustrating an exemplary deep convolutional network (DCN) in accordance with aspects of the present disclosure.

FIG. 3B is a block diagram illustrating an exemplary deep convolutional network 350. The deep convolutional network 350 may include multiple different types of layers based on connectivity and weight sharing. As shown in FIG. 3B, the exemplary deep convolutional network 350 includes multiple convolution blocks (e.g., C1 and C2). Each of the convolution blocks may be configured with a convolution layer, a normalization layer (LNorm), and a pooling layer. The convolution layers may include one or more convolutional filters, which may be applied to the input data to generate a feature map. Although only two convolution blocks are shown, the present disclosure is not so limiting, and instead, any number of convolutional blocks may be included in the deep convolutional network 350 according to design preference. The normalization layer may be used to normalize the output of the convolution filters. For example, the normalization layer may provide whitening or lateral inhibition. The pooling layer may provide down sampling aggregation over space for local invariance and dimensionality reduction.

The parallel filter banks, for example, of a deep convolutional network may be loaded on a CPU 102 or GPU 104 of an SOC 100, optionally based on an ARM instruction set, to achieve high performance and low power consumption. In alternative embodiments, the parallel filter banks may be loaded on the DSP 106 or an ISP 116 of an SOC 100. In addition, the DCN may access other processing blocks that may be present on the SOC, such as processing blocks dedicated to sensors 114 and navigation 120.

The deep convolutional network 350 may also include one or more fully connected layers (e.g., FC1 and FC2). The deep convolutional network 350 may further include a logistic regression (LR) layer. Between each layer of the deep convolutional network 350 are weights (not shown) that are to be updated. The output of each layer may serve as an input of a succeeding layer in the deep convolutional network 350 to learn hierarchical feature representations from input data (e.g., images, audio, video, sensor data and/or other input data) supplied at the first convolution block C1.

Figure 4:
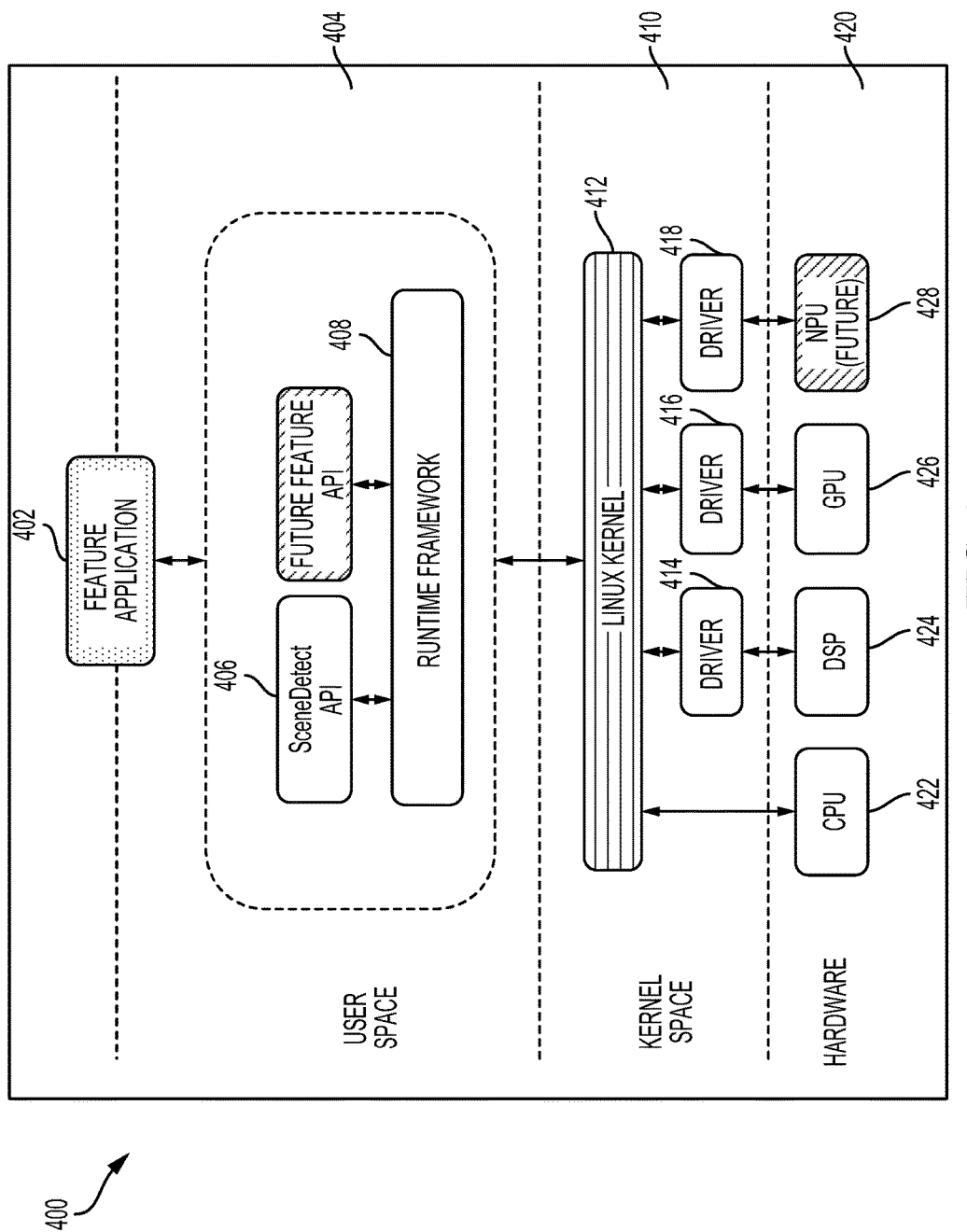
FIG. 4 is a block diagram illustrating an exemplary software architecture that may modularize artificial intelligence (AI) functions in accordance with aspects of the present disclosure.

FIG. 4 is a block diagram illustrating an exemplary software architecture 400 that may modularize artificial intelligence (AI) functions. Using the architecture, applications 402 may be designed that may cause various processing blocks of an SOC 420 (for example a CPU 422, a DSP 424, a GPU 426 and/or an NPU 428) to perform supporting computations during run-time operation of the application 402.

The AI application 402 may be configured to call functions defined in a user space 404 that may, for example, provide for the detection and recognition of a scene indicative of the location in which the device currently operates. The AI application 402 may, for example, configure a microphone and a camera differently depending on whether the recognized scene is an office, a lecture hall, a restaurant, or an outdoor setting such as a lake. The AI application 402 may make a request to compiled program code associated with a library defined in a SceneDetect application programming interface (API) 406 to provide an estimate of the current scene. This request may ultimately rely on the output of a deep neural network configured to provide scene estimates based on video and positioning data, for example.

A run-time engine 408, which may be compiled code of a Runtime Framework, may be further accessible to the AI application 402. The AI application 402 may cause the run-time engine, for example, to request a scene estimate at a particular time interval or triggered by an event detected by the user interface of the application. When caused to estimate the scene, the run-time engine may in turn send a signal to an operating system 410, such as a Linux Kernel 412, running on the SOC 420. The operating system 410, in turn, may cause a computation to be performed on the CPU 422, the DSP 424, the GPU 426, the NPU 428, or some combination thereof. The CPU 422 may be accessed directly by the operating system, and other processing blocks may be accessed through a driver, such as a driver 414-418 for a DSP 424, for a GPU 426, or for an NPU 428. In the exemplary example, the deep neural network may be configured to run on a combination of processing blocks, such as a CPU 422 and a GPU 426, or may be run on an NPU 428, if present.

Figure 5:
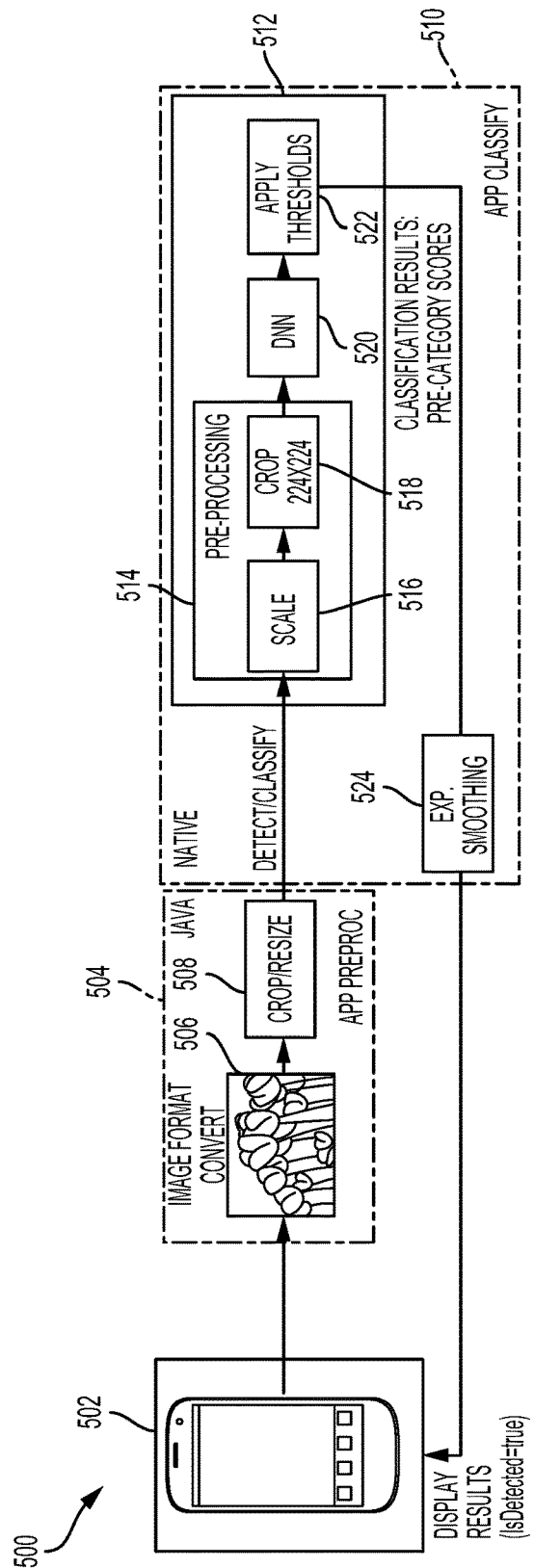
FIG. 5 is a block diagram illustrating the run-time operation of an AI application on a smartphone in accordance with aspects of the present disclosure.

FIG. 5 is a block diagram illustrating the run-time operation 500 of an AI application on a smartphone 502. The AI application may include a pre-process module 504 that may be configured (using for example, the JAVA programming language) to convert the format of an image 506 and then crop and/or resize the image 508. The pre-processed image may then be communicated to a classify application 510 that contains a SceneDetect Backend Engine 512 that may be configured (using for example, the C programming language) to detect and classify scenes based on visual input. The SceneDetect Backend Engine 512 may be configured to further preprocess 514 the image by scaling 516 and cropping 518. For example, the image may be scaled and cropped so that the resulting image is 224 pixels by 224 pixels. These dimensions may map to the input dimensions of a neural network. The neural network may be configured by a deep neural network block 520 to cause various processing blocks of the SOC 100 to further process the image pixels with a deep neural network. The results of the deep neural network may then be thresholded 522 and passed through an exponential smoothing block 524 in the classify application 510. The smoothed results may then cause a change of the settings and/or the display of the smartphone 502.

In one configuration, a machine learning model is configured for labelling a crop from an image including an object of interest with an indication of how well the object is framed. The machine learning model is also configured for determining a class estimate for the crop including the object of interest. The model includes labeling means and/or determining means. In one aspect, the labeling means and/or determining means may be the general-purpose processor 102, program memory associated with the general-purpose processor 102, memory block 118, local processing units 202, and or the routing connection processing units 216 configured to perform the functions recited. In another configuration, the aforementioned means may be any module or any apparatus configured to perform the functions recited by the aforementioned means.

In another configuration, a machine learning model is configured for selecting a crop from an image. The machine learning model is also configured for determining whether the crop of the image includes an area surrounded by a predetermined bounding box. The machine learning model is further configured for discarding the crop if the image does not include the area. The model includes selecting means, determining means, and/or discarding means. In one aspect, the selecting means, determining means, and/or discarding means may be the general-purpose processor 102, program memory associated with the general-purpose processor 102, memory block 118, local processing units 202, and or the routing connection processing units 216 configured to perform the functions recited. In another configuration, the aforementioned means may be any module or any apparatus configured to perform the functions recited by the aforementioned means.

According to certain aspects of the present disclosure, each local processing unit 202 may be configured to determine parameters of the model based upon desired one or more functional features of the model, and develop the one or more functional features towards the desired functional features as the determined parameters are further adapted, tuned and updated.

Training Convolutional Neural Networks for Improved Bounding Box Classification

In accordance with aspects of the present disclosure, an artificial neural network, such as a convolutional neural network (CNN), for example, may be trained for improved bounding box classification. A CNN may be pre-trained for bounding box classification by learning to be location-sensitive. That is, the CNN may be trained to learn a label according to how "well-framed" an image is relative to a bounding box (e.g., ground truth bounding box). In one exemplary aspect, the CNN may initially be trained using a large dataset (of images) without bounding boxes to learn a variety of objects (e.g., a flower, a car, a forklift, etc.) Thereafter, the CNN may be trained to localize the learned objects. Random samples or crops of an image may be taken. Each of the crops may in turn be evaluated to determine a label based on how well-framed the object is (how much of the object is included within the crop). In some aspects, the extent or degree of framing (proportion of the object within a crop) may be determined (e.g., 3%, 25%, 90%, etc.) One or more thresholds may be applied to determine the label (e.g., framed, partially framed, or not present). Accordingly, a classification may be assigned for each labeled crop.

In some aspects, the full-image label may be varied based on the randomly selected data augmentation crop. In one example, using the bounding box ground truth annotations, it may be known whether the randomly selected crop contains the object of interest, only contains a portion of the object of interest, or does not contain it at all. Thus, the number of classes may be increased from N to 2*N+1, as follows:
  N labels for when the object of interest is nicely framed in the crop,
  N labels for when the object of interest is partially visible in the crop, and
  One label for when the object of interest is not visible in the crop ('background').

In some aspects, a double output may be used in the convolutional neural networks:
  One regular output with N labels that always generates an error gradient.
  One 'localization output' with 2*N+1 labels, which only generates an error gradient when a bounding box is available.

Figure 6:
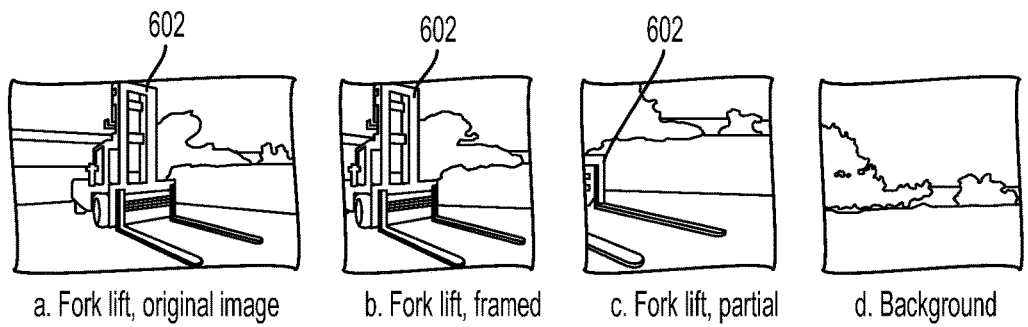
FIG. 6 is an exemplary set of crops labeled according to an extent of framing relative to one or more bounding box associated with an image in accordance with aspects of the present disclosure.

FIG. 6 is an exemplary set of crops labeled according to an extent of framing relative to one or more bounding box associated with an image, in accordance with aspects of the present disclosure. A full image including a forklift is shown in box a. Crops are taken of the full image as shown in boxes b, c, and d. Although three crops are shown, this is merely exemplary, for ease of explanation, and not limiting. An object 602 (e.g., a forklift) included in a bounding box (not shown) associated with the full image may be identified using the CNN. The extent of the object (e.g., forklift) that is within each crop (e.g., box b, box c, and box d) of the image may be determined. A label indicating how well-framed (the extent to which the object is included in the crop) may be determined for each crop based on the determined extent. In box b, all or nearly all of the forklift is shown in the crop and the crop may accordingly be labeled 'framed'. In box c, a portion of the forklift is shown in the crop, and the crop may accordingly be labeled 'partial'. However, the forklift is not shown in box d. As such, the crop of box d may be labeled 'background' to indicate that the object is not present. Of course, the labels and number thereof are merely exemplary and not limiting.

Modulating Classification Results Using Inferred Background Labels

At test-time during full-image classification, multiple crops of each image may be tested (e.g., 150). In some aspects, a CNN (e.g., a CNN pre-trained for bounding box classification) may be used during testing to estimate for each crop whether it is a 'background' patch. For example, each crop may be assigned a background probability. The higher the background probability, the more likely it is that the crop includes background rather than an object for which classification is desired. In some aspects, crops having a higher background probability may have lower contribution to the classification results. Conversely, crops that have a lower background probability are more likely to include an object for which classification is desired, and thus, such crops may have higher contributions to the classification results.

In some aspects, the background labels may be used to modulate labels provided by a second network. For example, if the background detecting network indicates a patch is background, the classifying network results (e.g., labels) may be weighted lower than if the background detecting network indicated the patch is not background.

Using a Convolutional Neural Network-Aligned Border Around the Crop in Bounding Box Classification As discussed above, CNNs may be used to classify the contents of proposed bounding boxes. A common technique is to add a small border around the crop such that the convolutional neural network may observe or detect that the object is 100% contained in the bounding box. For example, an animal like a snake can have an arbitrary length. As such, it may be desirable to look beyond the proposed bounding box so that the bounding box contains the entire snake. In one example, the proposed bounding box may be cropped from the image. The bounding box may be scaled and warped to match the input size of the network. For instance, the bounding box may be scaled and warped to a square input for a neural network (e.g., CNN). In some aspects, an additional border may be included in the crop of the proposed bounding box. The network may be trained to generate a label indicating whether the crop observed includes the entire object, a partial object or no object at all. Accordingly, another benefit is that the border will allow the convolutional neural network to develop 'end-of-object' detectors. One goal with respect the 'end-of-object' detectors is to allow a network to determine whether the 'entire' object is being observed. This may be done by presenting the network with a portion of the image that is beyond the bounding box (e.g., the border around the bounding box). This is useful because some objects, such as skyscrapers, may have an arbitrary length or size. Accordingly, it may be beneficial to configure the network to observe an area beyond the bounding box to determine whether the entire object is within the bounding box.

Figure 7A:
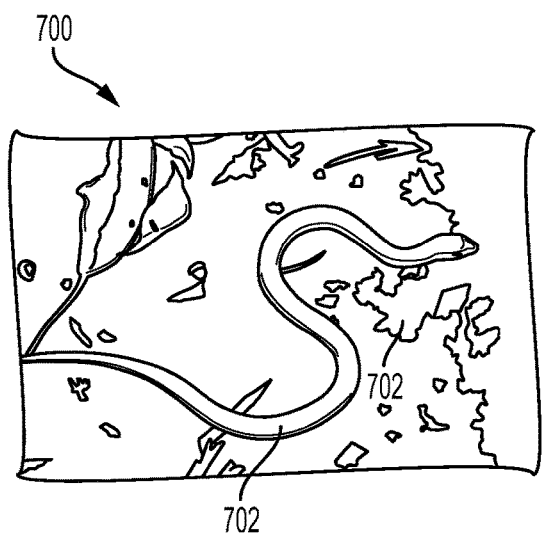
FIGS. 7A-B illustrate an exemplary crop of an image including an additional border around a bounding box in accordance with aspects of the present disclosure.
Figure 7B:
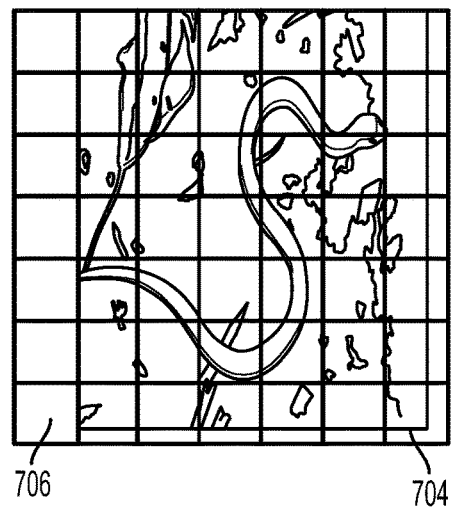

FIGS. 7A-B illustrate an exemplary crop of an image, including an additional border around a bounding box, in accordance with aspects of the present disclosure. FIG. 7A illustrates an image 700 of a snake 702. A proposed bounding box (not shown) is determined for the image and placed about the snake. As shown in FIG. 7B, a crop 704 of the image is taken. The crop 704 is scaled and warped to a square input. An additional border 706 is included in the crop 704. Accordingly, the crop may be supplied to a network and evaluated to determine the extent to which the snake is included in the crop.

A typical convolutional neural network performs its final convolution at a resolution of 7×7 'pixels.' In this aspect, the term 'pixel' may also be referred to as modules or features in a feature map of the convolution. However, in accordance with aspects of the present disclosure, an additional border (e.g., corresponding to 1 feature wide) may be used in that final output resolution to improve object localization.

Label-Preserving Data Augmentation

As discussed above, during data augmentation for full-image classification, random crops of the image may be used to train the network. However, in some cases, the crop does not contain the labeled object. In that case, the CNN may be forced to learn something that is not visible in the training image, causing 'confusion' or overfitting.

To overcome these issues, in some aspects, bounding boxes (e.g., ground truth bounding boxes) may be used to ensure that the selected crops include the labeled object or a portion thereof. That is, the random crops or samples may be limited to the area including the bounding box. This is in contrast to taking arbitrary crops over the entire image. Accordingly, each crop may be evaluated to determine whether the crop includes an area surrounded by a bounding box (e.g., ground truth bounding box or other predetermined bounding box). If the crop includes an area surrounded by a bounding box, the crop may be retained. On the other hand, if the crop does not include an area surrounded by a bounding box, the crop may be discarded and another crop can be selected. In this way, data augmentation may be label-preserving. That is, after data augmentation, the label still makes sense or is still reasonable and coherent. By way of example, with reference to FIG. 6A, if the original image of the forklift is cropped, such that the crop includes only background, it would not make sense or be reasonable to label the crop as forklift because the forklift is not shown. Rather, such a crop may be discarded and another crop may be selected. Alternatively, the crop may be labeled as background and retained.

Generate Missing Bounding Box Annotations

In some cases, bounding boxes or ground truth bounding boxes may not be available. When no bounding box information is available, it may be difficult to ensure that the labeled object is present in the selected crop.

To address this issue, in some aspects, the missing bounding boxes may be generated using the localization system of the present disclosure. For example, the missing bounding boxes may be generated using the bounding box proposal method described above. In some aspects, the generated bounding boxes may also be classified using the bounding box classification techniques (e.g., bounding box convnet) to determine the degree to which an object of interest is well-framed. These generated bounding box annotations may be added to the training set, thereby allowing the data augmentation to be label preserving for all images.

In some aspects, the bounding box may be scaled and warped to a square input for a neural network (e.g., CNN). An additional border may be included in the crop of the proposed bounding box. The network may be trained to generate a label indicating whether the network is observing the entire object, a partial object or no object at all. If the entire object is observed, the proposed bounding box may be updated. In some aspects, the area of the crop may be iteratively reduced to improve the bounding box proposal. The reduced crop may be evaluated to determine the extent to which the object is included in the crop. If the entire object is included in the reduced crop, the proposed bounding box may be updated. On the other hand, if the reduced crop includes less than the entire object (e.g., partial object or background), then the bounding box proposal may be maintained.

In some aspects, if the crop includes a partial image, the size of the additional border may be increased and the crop may be reevaluated to determine a bounding box tightly fit around the object of interest (e.g., having reduced and possibly minimal background included in the bounding box).

Furthermore, having generated a bounding box, the bounding box may be used to guide selection of further image crops. That is, random crops of the image may be limited to the generated bounding box.

Figure 8:
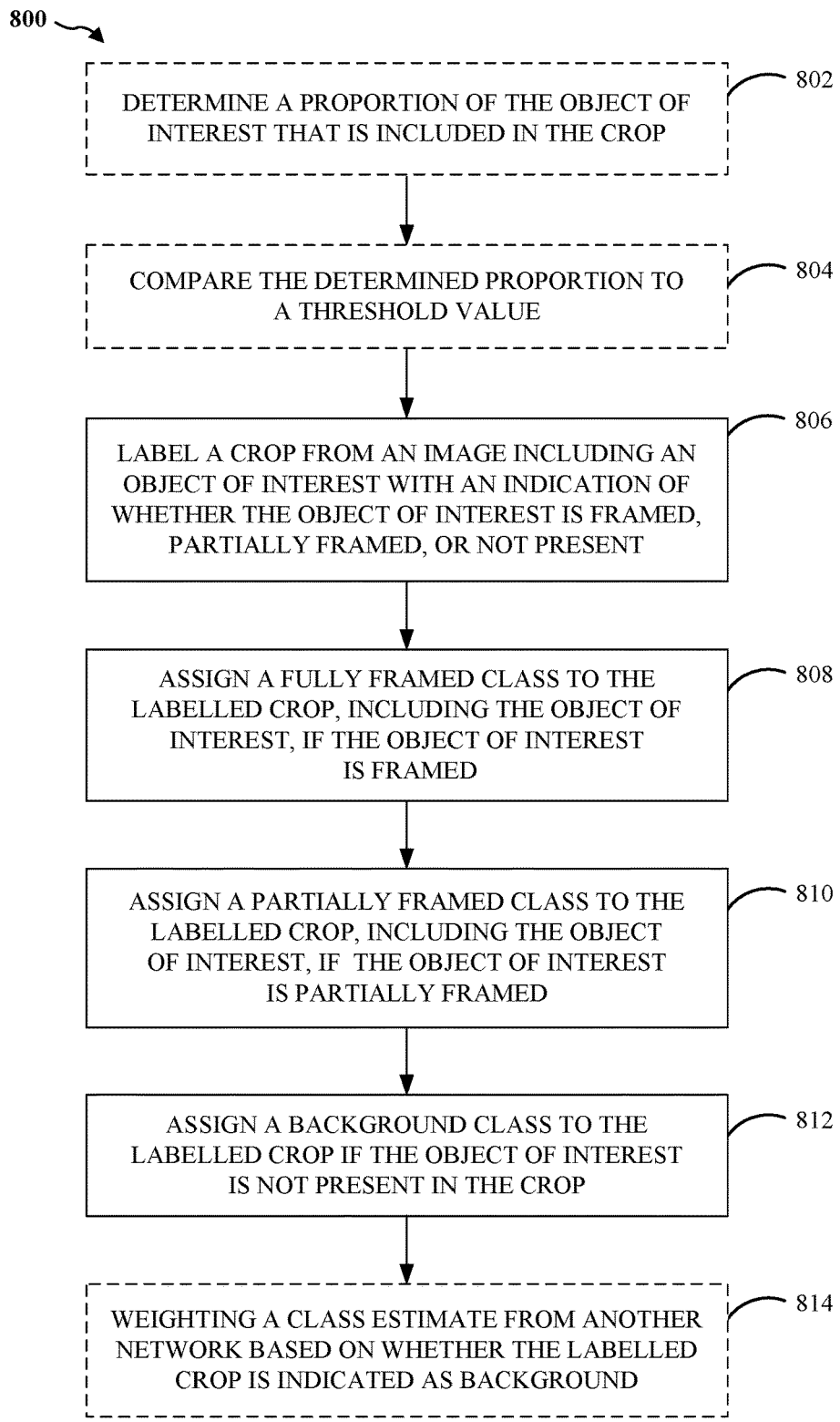
FIG. 8 is a flow diagram illustrating a method of training for image classification in accordance with aspects of the present disclosure.

FIG. 8 illustrates a method 800 of training for image classification. In block 806, the process labels a crop from an image including an object of interest with an indication of whether the object of interest is framed, partially framed or not present in the crop. For instance, a computational network (e.g., CNN) may initially be trained using a large dataset (of images) without bounding boxes to learn a variety of objects (e.g., a flower, a car, a forklift, etc.) The network may also be trained to localize the learned objects. Random samples or crops of an image may be taken and each of the crops may be evaluated to determine a label based on how well-framed the object is (e.g., how much of the object is included within the crop).

In some aspects, the crops may be optionally labeled by initially determining a proportion of the object of interest that is included in the crop, in block 802. For example, the extent or degree of framing (proportion of the object within a crop) may be determined (e.g., 3%, 25%, 90%, etc.) Additionally, the process may optionally compare the determined proportion to a threshold value with the comparison being used to label the crops, in block 804.

In block 808, the process assigns a fully framed class to the labelled crop, including the object of interest, if the object of interest is framed (e.g., the entire image or a substantial portion thereof is included in the crop). In block 810, the process assigns a partially framed class to the labelled crop, including the object of interest, if the object of interest is partially framed (e.g., less than the entire object is included in the crop). In block 812, the process assigns a background class to the labelled crop if the object of interest is not present (e.g., absent or substantially absent) in the crop.

In some aspects, the process may optionally weight a class estimate from another network based on whether the labelled crop is indicated as background, in block 814. In one example, when object classification for the object of interest in the crops is provided by another network or entity, the background class labels for those crops may be used to modulate labels provided by a second network. For instance, if the background detecting network indicates a patch or crop is background (e.g., the crop has been assigned a background classification), the classifying network results (e.g., labels) may be weighted lower than if the background detecting network indicated the patch is not background (e.g., assigned a classification of fully framed or partially framed).

Figure 9A:
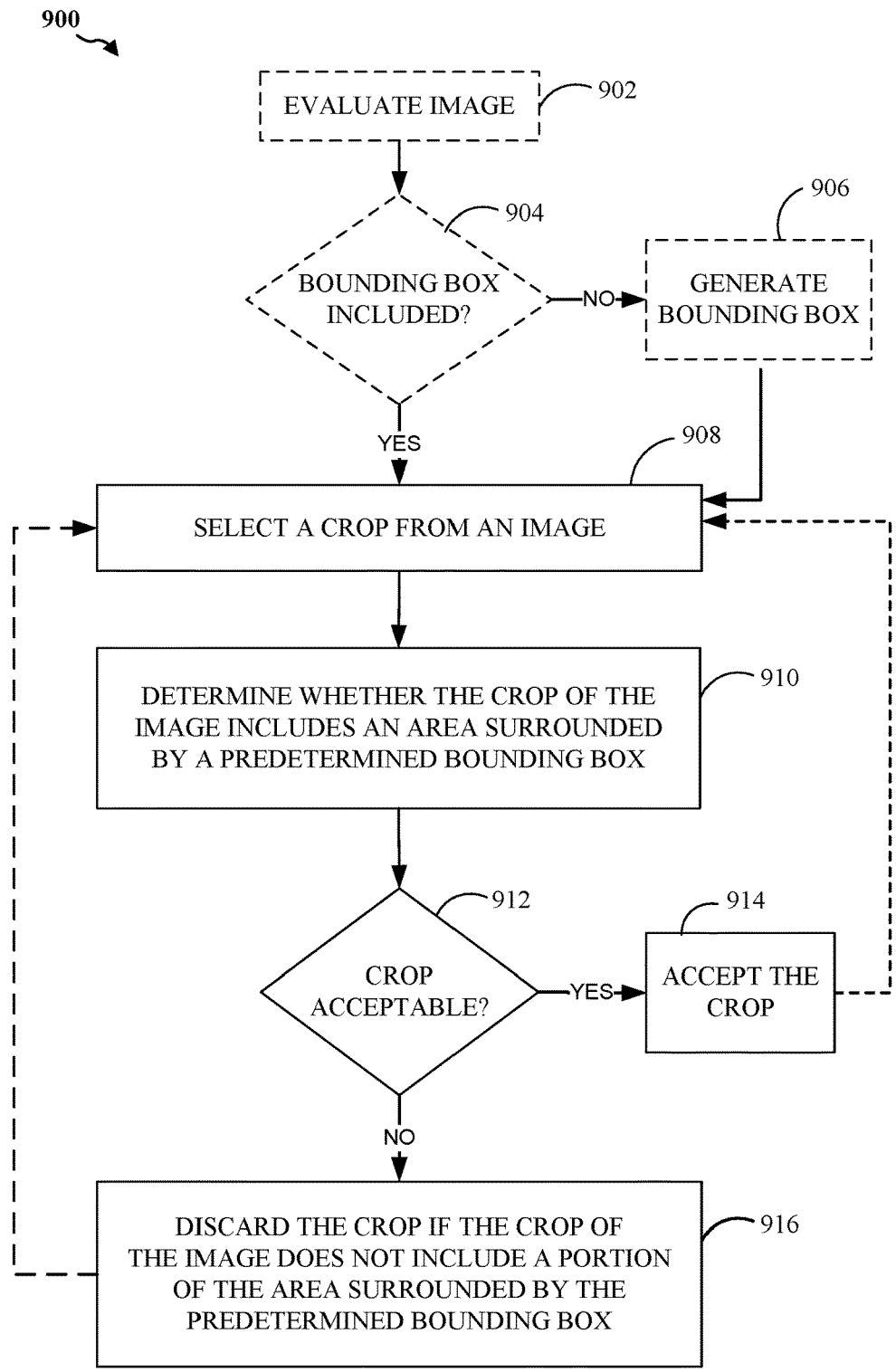
FIG. 9A is a flow diagram illustrating a method of training for image classification in accordance with aspects of the present disclosure.

FIG. 9A illustrates a method 900 for image classification. Initially, the process may optionally evaluate an image at block 902. For instance, in block 904, the process may determine whether the image includes a bounding box. If the image does not include a bounding, the process may optionally generate a bounding box at block 906. In one aspect, the bounding box may be generated as discussed below with reference to FIG. 9B.

On the other hand, if the image includes a bounding box, in block 908, the process selects a crop from an image. In block 910, the process determines whether the crop of the image includes an area surrounded by a predetermined bounding box. In block 912, the process decides whether the crop of the image is acceptable based on the determination at block 910. For example, each crop may be evaluated to determine whether the crop includes an area surrounded by a ground truth bounding box or other predetermined bounding box (e.g., a processor generated bounding box as described in FIG. 9B). If the crop of the image includes the area surrounded by the predetermined bounding box, the crop is accepted in block 914. In some aspects, the process may return to block 908 to select a new crop of the image for evaluation.

On the other hand, if the crop of the image does not include a portion of the area surrounded by the predetermined bounding box, the crop may be discarded in block 916. The process may, in some aspects, return to block 908 to select a new crop of the image for evaluation.

Figure 9B:
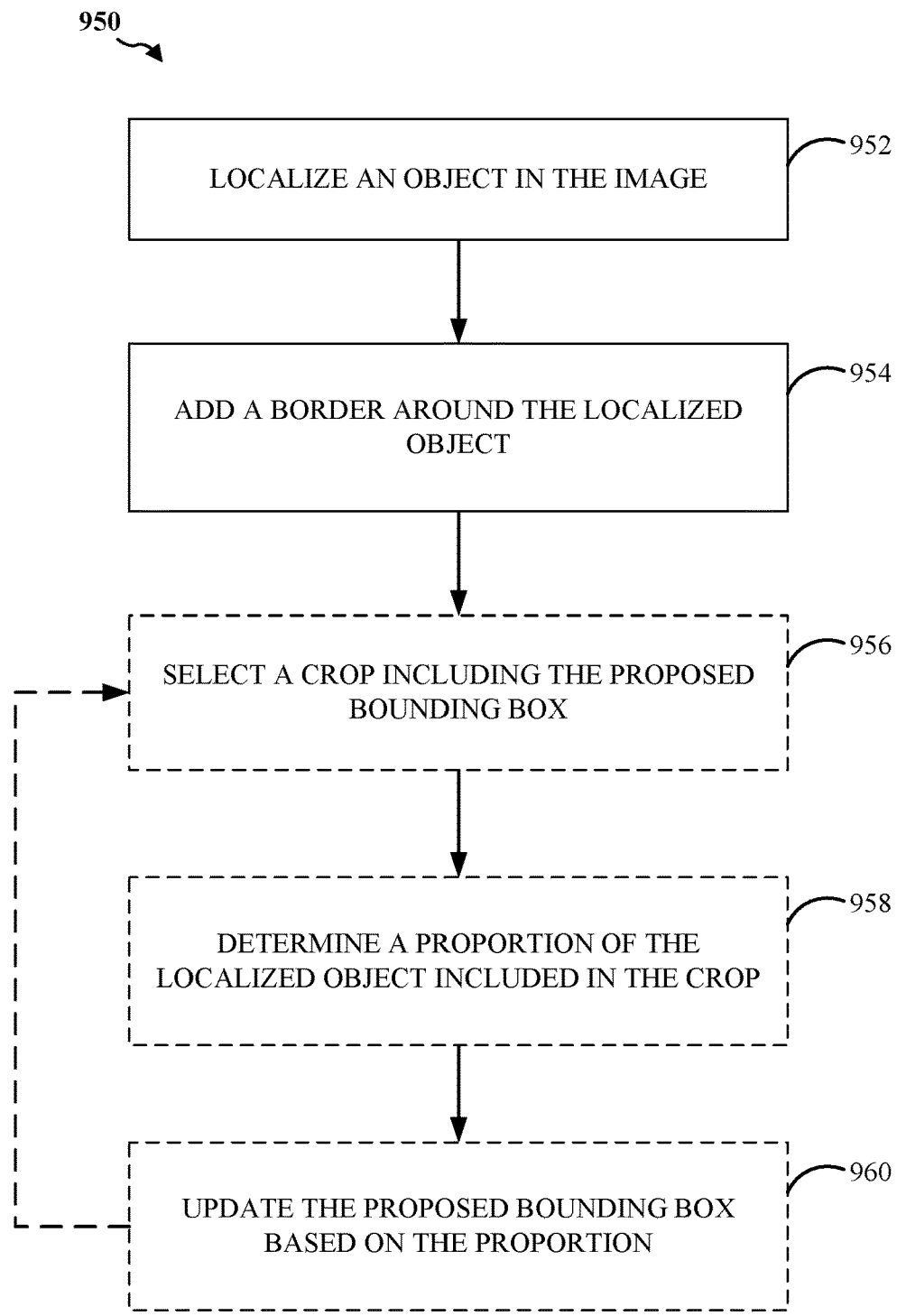
FIG. 9B is a flow diagram illustrating an automated method of generating a bounding box for image classification in accordance with aspects of the present disclosure.

FIG. 9B illustrates an automated process 950 for generating a bounding box for image classification in accordance with aspects of the present disclosure. In block 952, the process may localize one or more objects in the image. The location of an object in an image may be determined, for example, using an automated localization technique. In block 954, the process may further place a border such as a tight box or other shaped boundary (e.g., a circle, rectangle or other polygon) around the localized object or around an area of the image including the object(s)). The border may be placed using a processor comprises a bounding box.

In some aspects, the bounding box may be further evaluated and improved for more efficient image processing and classification. For instance, in block 956, the process may select a crop including the bounding box (which may be considered a proposed bounding box). The crop may be selected using random sampling or other sampling techniques. In block 958, the process may determine a proportion of the localized object included in the crop. For example, the process may determine if the crop includes the entire object, a partial object, or no part of the object. If the entire object is observed, the proposed bounding box may be too large, thus indicating that the bounding box size may be reduced. On the other hand, if the crop includes less than the entire object (e.g., partial object or background), then the bounding box may be too tightly fit around the object of interest (e.g., having reduced and possibly minimal background included in the bounding box).

In block 960, the process may update the proposed bounding box based on the proportion. For example, in some aspects, where the bounding box is too tightly fit (e.g., the proportion is below a certain threshold) the size of the border may be increased. In some aspects, the process may return to block 956 to evaluate and further refine the updated bounding box proposal.

The various operations of methods described above may be performed by any suitable means capable of performing the corresponding functions. The means may include various hardware and/or software component(s) and/or module(s), including, but not limited to, a circuit, an application specific integrated circuit (ASIC), or processor. Generally, where there are operations illustrated in the figures, those operations may have corresponding counterpart means-plus-function components with similar numbering.

In some aspects, methods 800, 900, and 950 may be performed by the SOC 100 (FIG. 1) or the system 200 (FIG. 2). That is, each of the elements of methods 800, 900, and 950 may, for example, but without limitation, be performed by the SOC 100 or the system 200 or one or more processors (e.g., CPU 102 and local processing unit 202) and/or other components included therein.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general-purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general-purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable Read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or general register files. Although the various components discussed may be described as having a specific location, such as a local component, they may also be configured in various ways, such as certain components being configured as part of a distributed computing system.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for image classification, comprising:
    labelling, by a first artificial neural network, a crop from an image including an object of interest with an indication of whether the object of interest is framed, partially framed, or not present in the crop;
    assigning a fully framed class to the labelled crop, including the object of interest, when the object of interest is framed;
    assigning a partially framed class to the labelled crop, including the object of interest, when the object of interest is partially framed;
    assigning a background class to the labelled crop when the object of interest is not present in the crop; and
    classifying the object of interest in the image based on a class assigned to the labelled crop.

2. The method of claim 1, further comprising:
    weighting a class estimate from a second artificial neural network based on whether the labelled crop is indicated as the background class.

3. The method of claim 1, further comprising:
    determining a proportion of the object of interest that is included in the crop; and
    comparing the determined proportion to at least one threshold value, and in which the labelling is based on the comparing.

4. A method of training an artificial neural network for image classification, comprising:
    selecting a crop from an image;
    determining whether the crop of the image includes an area surrounded by a predetermined bounding box;
    discarding, prior to the training, the crop when the crop of the image does not include a portion of the area surrounded by the predetermined bounding box; and
    training the artificial neural network to determine a label of the crop of the image including an object of interest with an indication of whether the object of interest is framed, partially framed, or not present in the crop, the artificial network trained for the image classification of the object of interest in the image with a plurality of crops from the image, the classification based on a class assigned to the labelled crop, each crop comprising at least a portion of the area surrounded by the predetermined bounding box.

5. The method of claim 4, further comprising generating a proposed bounding box for the image if the image lacks the predetermined bounding box, before discarding the crop.

6. The method of claim 5, further comprising:
    selecting a new crop from the image;
    determining whether the new crop of the image includes the area surrounded by the proposed bounding box; and
    discarding the new crop if the new crop of the image does not include a portion of the area surrounded by the proposed bounding box.

7. The method of claim 5, in which the generating comprises:
    localizing at least one object in the image; and
    adding a border around the localized at least one object.

8. The method of claim 7, further comprising:
    selecting a second crop including the proposed bounding box;
    determining a proportion of the localized at least one object that is included in the second crop; and
    updating the proposed bounding box based on the determined proportion.

9. An apparatus for image classification, comprising:
    a memory; and
    at least one processor coupled to the memory, the at least one processor configured:
        to label, by a first artificial neural network, a crop from an image, including an object of interest with an indication of whether the object of interest is framed, partially framed, or not present in the crop;
        to assign a fully framed class to the labelled crop, including the object of interest, when the object of interest is framed;

to assign a partially framed class to the labelled crop, including the object of interest, when the object of interest is partially framed;

to assign a background class to the labelled crop when the object of interest is not present in the crop; and to classify the object of interest in the image based on a class assigned to the labelled crop.

10. The apparatus of claim 9, in which the at least one processor is further configured to weight a class estimate from a second artificial neural network, based on whether the labelled crop is indicated as the background class.

11. The apparatus of claim 9, in which the at least one processor is further configured:

to determine a proportion of the object of interest that is included in the crop; and to compare the determined proportion to at least one threshold value, and in which the labelling is based on the comparing.

12. An apparatus for training an artificial neural network for image classification, comprising:

a memory; and at least one processor coupled to the memory, the at least one processor configured:

to select a crop from an image;

to determine whether the crop of the image includes an area surrounded by a predetermined bounding box;

to discard, prior to the training, the crop when the crop of the image does not include a portion of the area surrounded by the predetermined bounding box; and to train the artificial neural network to determine a label of the crop of the image including an object of interest with an indication of whether the object of interest is framed, partially framed, or not present in the crop, the artificial network trained for the image classification of the object of interest in the image with a plurality of crops from the image, the classification based on a class assigned to the labelled crop, each crop comprising at least a portion of the area surrounded by the predetermined bounding box.

13. The apparatus of claim 12, in which the at least one processor is further configured to generate a proposed bounding box for the image if the image lacks the predetermined bounding box, before discarding the crop.

14. The apparatus of claim 13, in which the at least one processor is further configured:

to select a new crop from the image;

to determine whether the new crop of the image includes the area surrounded by the proposed bounding box; and to discard the new crop if the new crop of the image does not include a portion of the area surrounded by the proposed bounding box.

15. The apparatus of claim 13 in which the at least one processor is further configured to generate the proposed bounding box:

by localizing at least one object in the image; and by adding a border around the localized at least one object.

16. The apparatus of claim 15, in which the at least one processor is further configured:

to select a second crop including the proposed bounding box;

to determine a proportion of the localized at least one object that is included in the second crop; and to update the proposed bounding box based on the determined proportion.

* * * * *